(12) United States Patent
Yasuda (10) Patent No.: US 8,237,800 B2
(45) Date of Patent: Aug. 7, 2012

(54) MAIN FACE CHOOSING DEVICE, METHOD FOR CONTROLLING SAME, AND IMAGE CAPTURING APPARATUS

(75) Inventor: Hitoshi Yasuda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 164 days.

(21) Appl. No.: 12/634,181

(22) Filed: Dec. 9, 2009

(65) Prior Publication Data
US 2010/0149369 A1    Jun. 17, 2010

(30) Foreign Application Priority Data
Dec. 15, 2008  (JP) ................................ 2008-318942

(51) Int. Cl.
*H04N 5/225* (2006.01)
(52) U.S. Cl. ................. 348/169; 348/222.1; 348/208.14
(58) Field of Classification Search .............. 348/222.1, 348/169, 208.14
See application file for complete search history.

(56) References Cited

U.S. PATENT DOCUMENTS

| | | | |
|---|---|---|---|
| 2005/0254725 A1* | 11/2005 | Nishi | 382/275 |
| 2006/0069999 A1* | 3/2006 | Mitsuhashi | 715/723 |
| 2007/0052820 A1* | 3/2007 | Ikeda | 348/231.99 |
| 2007/0071319 A1* | 3/2007 | Fukushima | 382/173 |
| 2008/0008361 A1* | 1/2008 | Nozaki et al. | 382/118 |
| 2008/0199056 A1 | 8/2008 | Tokuse | |
| 2009/0059023 A1* | 3/2009 | Sasaki | 348/222.1 |

FOREIGN PATENT DOCUMENTS

| | | |
|---|---|---|
| EP | 1589478 A2 | 10/2005 |
| EP | 1814082 A2 | 8/2007 |
| JP | 2007-074394 A | 3/2007 |
| JP | 2008-005438 | 1/2008 |
| JP | 2008-205650 | 9/2008 |

OTHER PUBLICATIONS

All the above documents were cited in the European Search Report of 09179311.7 dated Sep. 30, 2010.
The above reference was cited in a Jan. 30, 2012 Korean Office Action, that issued in Korean Patent Application No. 10-2009-0120316.

* cited by examiner

*Primary Examiner* — Usman Khan
(74) *Attorney, Agent, or Firm* — Cowan, Liebowitz & Latman, P.C.

(57) ABSTRACT

An image capturing apparatus chooses a main face from among faces detected in successively captured images based on a degree of priority calculated for each detected face. Moreover, the image capturing apparatus compares the degree of priority assigned to the face corresponding to a last chosen main face and the degrees of priority assigned to the faces corresponding to faces other than the main face, and then counts the number of times the degrees of priority assigned to the faces corresponding to faces other than the main face exceed the degree of priority assigned to the face corresponding to the main face. When one of the number of times counted for the faces other than the main face exceeds a preset threshold value, the image capturing apparatus performs a main face changeover to the one of the faces.

7 Claims, 6 Drawing Sheets

SUBJECT'S POSITION × SUBJECT'S SIZE × LAST MAIN FACE?

LARGE DIFFERENCE IN "SIZE" AND
ADVANTAGE OF DIFFERENCE IN "POSITION" + "LAST MAIN FACE?"
⇒ A IS IMMEDIATELY DETERMINED TO BE MAIN FACE

| EXAMPLE 1 | POSITION | SIZE | LAST VALUE | WEIGHT |
|---|---|---|---|---|
| A | 60% | 100% |  | 60% |
| B | 100% | 40% | 140% | 50% |

FIG. 7B
PRIOR ART

SUBJECT'S POSITION × SUBJECT'S SIZE × LAST MAIN FACE?

SAME SIZE,
SLIGHT DIFFERENCE IN SUBJECT'S POSITION, AND
EFFECT OF "LAST MAIN FACE?"
⇒ B REMAINS MAIN FACE

| EXAMPLE 2 | POSITION | SIZE | LAST VALUE | WEIGHT |
|---|---|---|---|---|
| A | 100% | 40% |  | 40% |
| B | 90% | 40% | 140% | 50% |

MAIN FACE CHOOSING DEVICE, METHOD FOR CONTROLLING SAME, AND IMAGE CAPTURING APPARATUS

BACKGROUND OF THE INVENTION

1. Field of the Invention

The present invention relates to a main face choosing device, a method for controlling the choosing device, and an image capturing apparatus.

2. Description of the Related Art

There has been heretofore produced image capturing apparatuses (e.g., digital still cameras and digital video cameras) with an auto-focus (AF) function with which a subject is automatically brought into focus and an auto-exposure (AE) function with which exposure is automatically performed. In order to more precisely perform AF, AE, and so on (hereinafter collectively referred to as "AF and so on") suited to the face of a human figure, some apparatuses have the function of detecting the face of a human figure in a captured image. Further, in cases where the faces of a plurality of human figures have been detected in a captured image, some of the apparatuses have the function of choosing the face of the human figure determined to be a main subject (hereinafter referred to as the "main face") from among the faces of the human figures.

In the above image capturing apparatuses, the choice of the main face has been made based on the states of the faces of the human figures in the captured image. The wording "the states of the faces of the human figures" used herein refers to parameters representing, for example, the positions of the faces in the captured image and the sizes of the faces.

However, where only the states of the human figures at a particular time have been taken into account, main face changeover occurs frequently due to a slight change in their states. Because of this, techniques have been proposed in which when choosing main faces in captured images, extremely frequent main face changeover is suppressed while giving much consideration to the states of the faces of human figures in captured images (see Japanese Patent Laid-Open Nos. 2008-005438 and 2008-205650).

Figure 4:
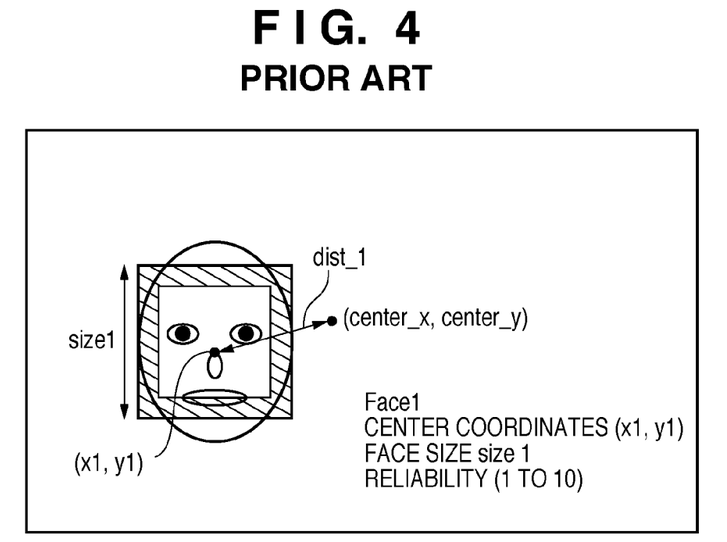
FIG. 4 illustrates an example of face information on a human figure in a captured image used in the related art.

The specific logic of the above techniques will be described below. FIG. 4 shows an example of information on the face of a human figure in a captured image. When a plurality of faces have been detected, face information is sought for each face.

Such face information includes the distance from the coordinates of the center of the captured image (center_x, center_y) to the coordinates of the center of the detected face (Face 1) (x1, y1). The information also includes a face size (size 1) representing the length of each side of the face assumed to be of a square shape and a reliability value representing a probability that the detected face will be the face of a human figure. These items of face information are obtained from the captured image by using a known face detection technique.

For example, from a state in which the majority of the face is flesh-colored, the face size can be set such that the ratio of the flesh-colored area in the predetermined-size square stands at a predetermined value. And further, from a state in which the pupils of eyes are black-colored, the reliability is determined based on whether there are two eyes or not, the distance between the two eyes, whether or not there is a nose between the two eyes, and so on. In this case, it is assumed that the reliability is represented on a scale from 1 to 10, and a 1 indicates the highest probability of the face being of a human figure.

Figure 5:
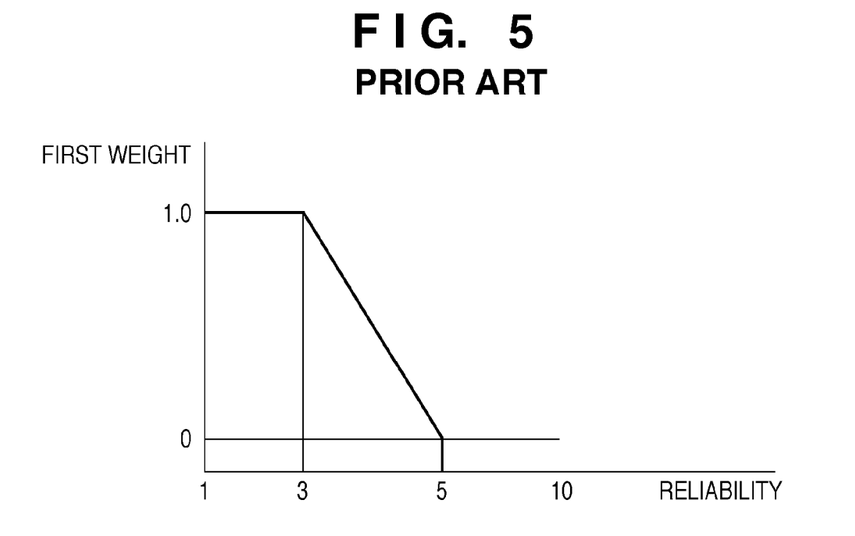
FIG. 5 is a graph showing face information reliability-weight characteristics presented in the related art.

Firstly, a first weight is calculated through the use of the reliability of the detected face and a reliability-weight characteristic graph as shown in FIG. 5. In FIG. 5, the x-axis indicates the input, that is, the reliability of the detected face, and the y-axis indicates the output, that is, the first weight. The first weight is set to 1.0 when the reliability stands between 1 to 3 inclusive; the point indicating the reliability 3 and the first weight of 1.0 and the point indicating the reliability 5 and the first weight of 0 are connected to each other with a straight line; and the first weight is set at 0 when the reliability stands at 5 or higher.

Figure 6A:
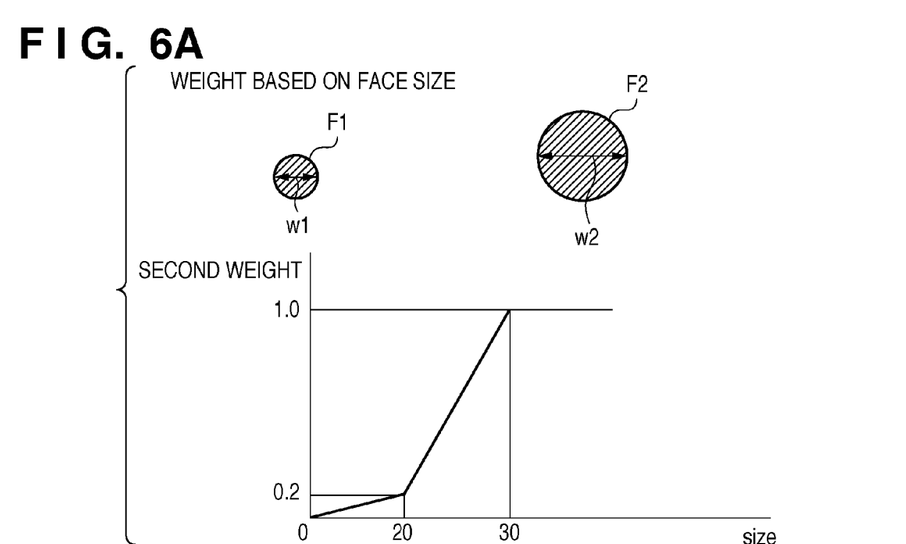
FIG. 6A consists of a schematic drawing illustrating face sizes and a graph showing the face size of the face information-weight characteristics used in the related art.

Next, a second weight is calculated through the use of the size of the detected face and a face size-weight characteristic graph in FIG. 6A. In FIG. 6A, the x-axis indicates the input, that is, the size of the detected face, and the y-axis indicates the output, that is, the second weight. For example, the point indicating a face size of 0 pixels and the second weight of 0 and the point indicating a face size of 20 pixels and the second weight of 0.2 are connected to each other with a straight line. And further, the point indicating a face size of 20 pixels and the second weight of 0.2 and the point indicating a face size of 30 pixels and the second weight of 1 are connected to each other with a straight line, and the second weight is set to 1.0 when a face size is 30 pixels or more.

In FIG. 6A, when the size W1 of a face F1 is not more than 20 pixels, the second weight is a maximum of 0.2. However, when the size W2 of a face F2 is in the range of 20 to 30 pixels, the second weight varies from 0.2 to 1.0. That is, when the face size exceeds 20 pixels representing a face size worthy of being determined as a main face, the value of the second weight changes abruptly; therefore, the face F2 worthy of being the main face is given a higher weight value.

Figure 6B:
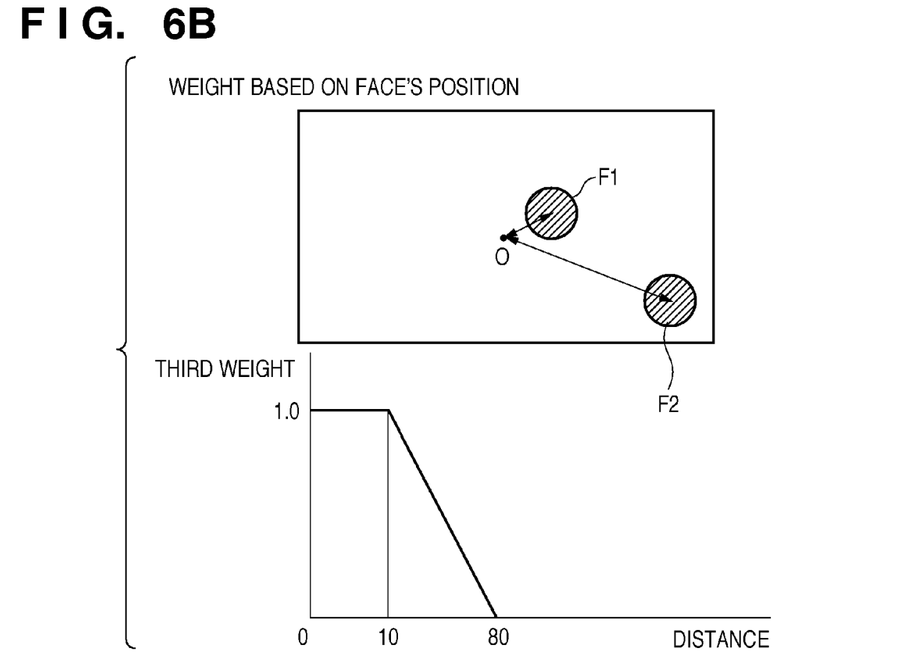
FIG. 6B consists of a schematic drawing illustrating distance information and a graph showing the distance information of the face information-weight characteristics used in the related art.

Moreover, as shown in FIG. 6B, distance information dist in the form of coordinate values on the distances between the center O of a captured image and the centers of detected faces F1 and F2 is extracted. Then third weights are calculated by using the extracted information dist and a distance-weight characteristic graph in FIG. 6B. For example, it is assumed that the size of the captured image in which face detection is to be done is 320×240 pixels, and the weight is set at 1.0 when the distance from the center O is 10 pixels or fewer. And further, the point indicating a distance of 10 pixels and a third weight of 1.0 and the point indicating a distance of 80 pixels and a third weight of 0 are connected to each other with a straight line, and the weight is set at 0 when the distance is 80 pixels or more.

In that case, when the distance from the center of the face F1 is of the order of 10 pixels, the weight is 1.0. However, when the distance from the center of the face F2 is not fewer than 10 pixels, the weight is below 1.0; when the distance from the center of the face F2 is 80 pixels or more, the weight is 0.

That is, the face F1, which is close to the image's center and worthy of being determined as a main face, is given a large weight value.

As a result of multiplying the first to third weights, the face with the largest weight value can be determined to be the most likely main face in the frame.

However, in cases where there is not a large difference in the composition of human figures between frames, it is expected that when the positions of the human figures and the reliability of the human figures' faces have changed slightly, a changeover to a face determined to be the most likely main face is performed for each frame. In such a case, since such main face changeovers happen frequently, images become unfavorably unsightly. Because of this, it is considered that once a main face has been chosen, there is a need not to readily effect a main face changeover.

Specifically, the coordinates of a face chosen as a main face at the time of the last face detection are read out, and then the distance between the coordinates read out and the coordinates of each newly detected face is determined by using, for example, Pythagorean theorem. Thereafter, the face nearest the last chosen main face is assigned a fourth weight of 1.4, and the other faces a fourth weight of 1.0.

Then the final weight of each face is calculated by multiplying the fourth weight and the product of the first to third weights, following which the face with the greatest final weight is determined (chosen) to be a main face at that time. Therefore, even in the case where faces other than the main face are higher than the main face in the weighting product based on their reliability, size, and position, the possibility that they are chosen as a newly determined main face is small when they are away from the face chosen as the main face at the time of the last face detection. Thus limitations are placed on main face changeover and, hence, frequent main face changeovers can be suppressed.

Figure 7A:
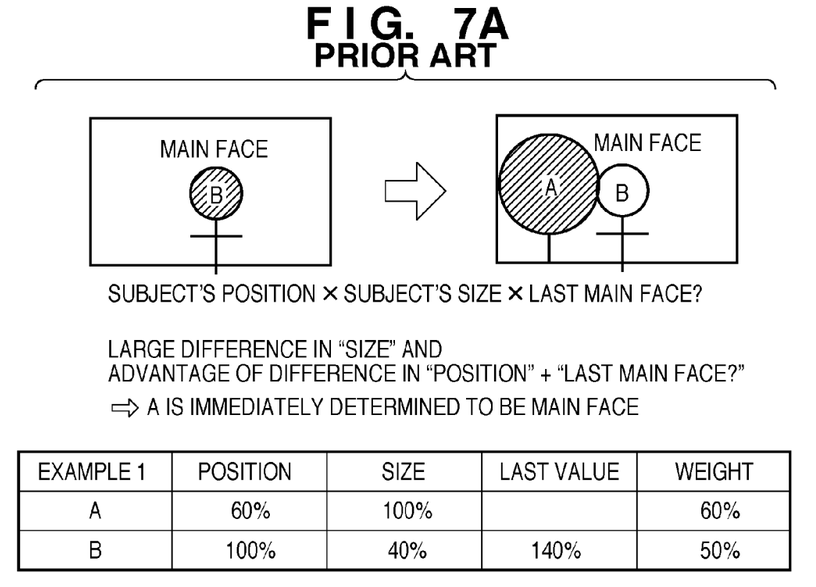
FIGS. 7A and 7B illustrate related-art main face determination operations performed when a face has been detected after the detection of a main face.
Figure 7B:
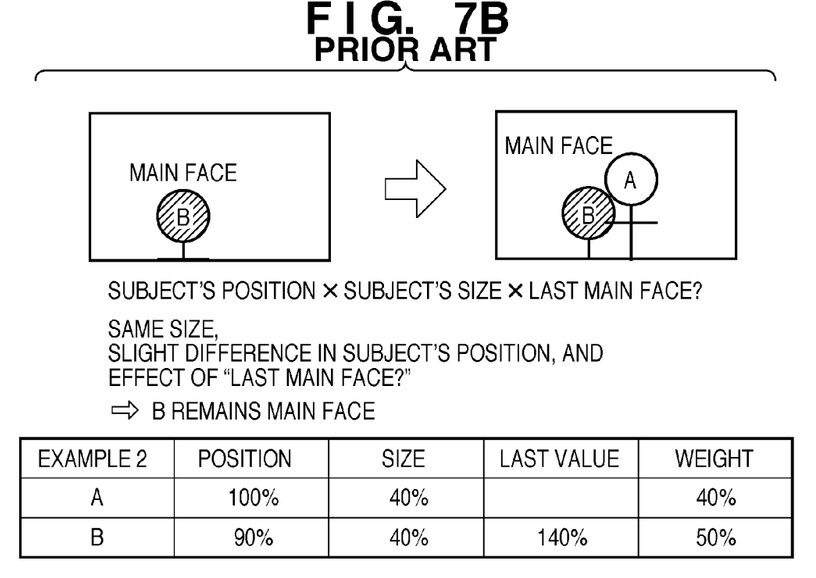

However, even when the above method is used, the following problems may arise. FIGS. 7A and 7B illustrate main face determination operations performed when a face A is detected after the detection of a main face B. In these operations, a final weight value is determined by multiplying (or adding) three weight values found from the position and size of each face and the distance between the last main face and each face, and then the next main face is determined based on the product (or sum).

As shown in FIG. 7A, when the face A of a passerby has been included in the captured image at a position between the image capturing apparatus and the main face B as a main subject for example, the face A image becomes much larger than the face B image. Therefore, even if the fourth weight described above is taken into consideration, the face A will be assigned a larger final weight value than the face B, and then a main face changeover from the face B to the face A will be immediately effected at such a time. In that case, the weight value assigned to the face A is as follows:

60%×100%×1.0(the fourth weight)/100%=60%

Likewise, the weight value assigned to the face B is as follows:

100%×40%×1.4(the fourth weight)/100%=56%

Moreover, as shown in FIG. 7B, in the case where a main face B was recognized before the detection of a face A which is the main subject the user wanted, the final weight value assigned to the face A does not exceed that assigned to the face B at times due to small differences in their sizes and their positions in the frame. In this case, the main face B has sometimes remained chosen as the main subject; therefore, the face A the user wanted has not been chosen as a main face at times. Incidentally, the weight value assigned to the face A is as follows:

100%×40%×1.0(the fourth weight)/100%=40%

Likewise, the weight value assigned to the face B is as follows:

90%×40%×1.4(the fourth weight)/100%=50.4≈50%

As such, the user can satisfy himself/herself that the faces of human figures present at the centers of successively captured images are each chosen to be a main face. However, the user might not desire frequent main face changeovers be done with faces having a weight value heightened abruptly such as faces which momentarily pass across the field of view. Also, the user might not desire that since the position of a main face, not in the center of the captured images, does not change in different frames, main face changeover does not occur. Such being the case, it is thought that the related art can be still further improved.

SUMMARY OF THE INVENTION

The present invention has been accomplished in view of such problems with the related art. The present invention provides a technique in which when face detection is performed in successively captured images, each main face changeover to a face suitable for a main face is done while suppressing frequent main face changeovers.

The present invention in its first aspect provides a main face choosing device comprising: a face detection unit adapted to detect, in time-series, faces of human figures in captured images successively captured by an image capturing unit and to determine which of the detected faces are the most recently detected faces; a calculation unit adapted to calculate a degree of priority for each face detected in time-series by the face detection unit such that a choice can be made of one of the detected faces as a main face based on at least one of size and position in the captured image of each detected face; a main face choosing unit adapted to choose a main face from among the detected faces based on the degree of priority calculated for each detected face; and a counting unit adapted to compare a degree of priority assigned to a last chosen main face and degrees of the priority assigned to faces other than the main face, and then to count a number of times the degrees of priority assigned to faces other than the main face exceed the degree of priority assigned to the main face for each of the faces other than the main face, wherein when, among the numbers of times counted by the counting unit for each of the faces other than the main face, the number of times counted for one of the faces other than the main face exceeds a preset threshold value, the main face choosing unit is arranged to perform a main face changeover from the most recent main face to the one of the faces which exceeded the threshold.

Further features of the present invention will become apparent from the following description of embodiments (with reference to the attached drawings).

DESCRIPTION OF THE EMBODIMENTS

An embodiment of the present invention will be described below with reference to the drawings.

Figure 1:
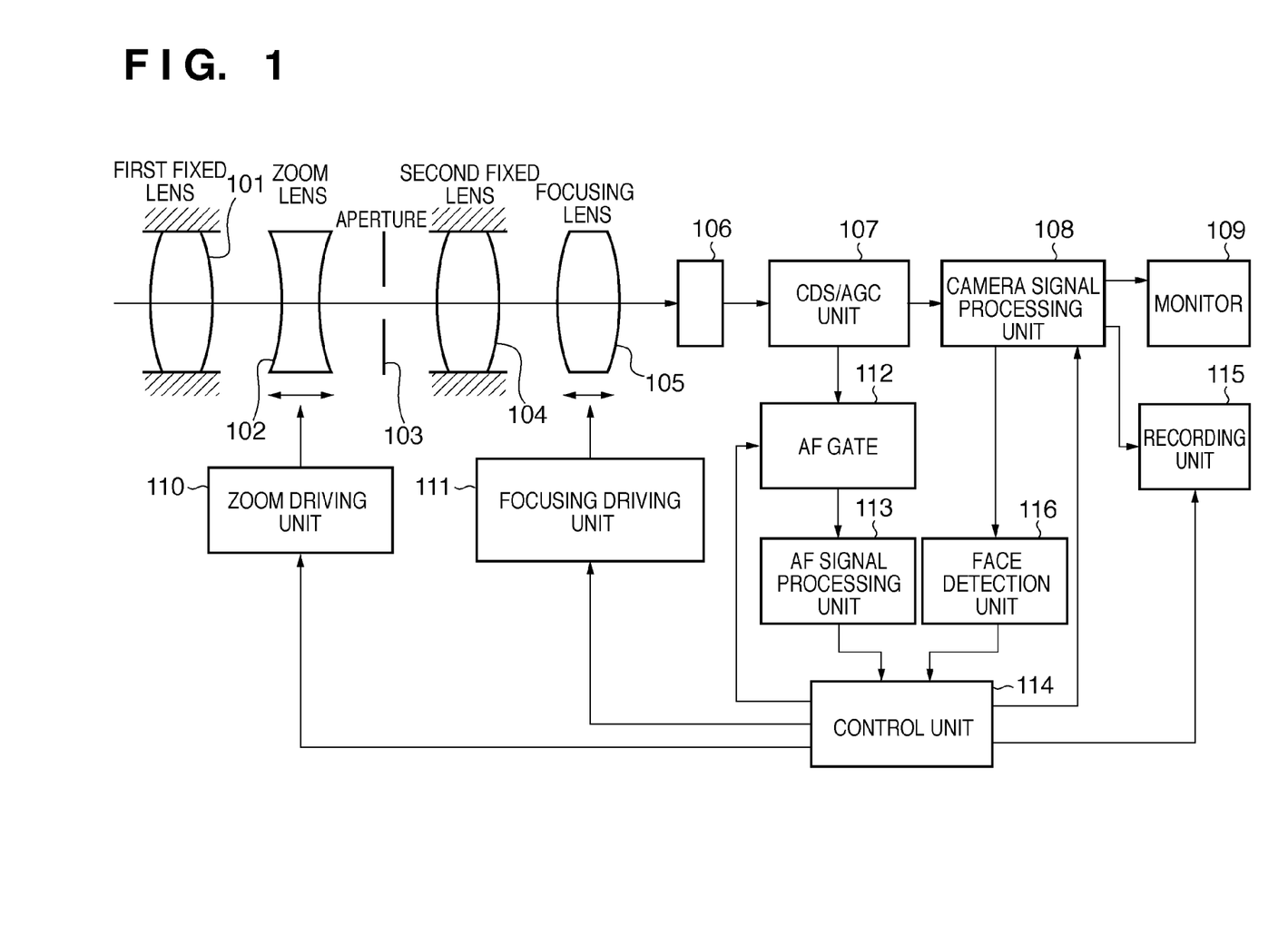
FIG. 1 is a block diagram illustrating the configuration of an image capturing apparatus according to an embodiment of the present invention.

FIG. 1 shows the configuration of an image capturing apparatus (video camera) 1 according to the embodiment of the invention. Incidentally, although this embodiment is explained using a video camera as an example of an image capturing apparatus 1 with a main face choosing device, the invention is also applicable to other image capturing apparatuses such as digital still cameras.

As shown in FIG. 1, a first fixed lens 101 and a second fixed lens 104 are lenses that are fixed without being moved in the direction of their optical axes. A zoom lens 102 is a lens that scales a subject image by being moved in the direction of its optical axis by a zoom driving unit 110. A focusing lens 105 is a lens that implements a function of correcting the movement of a focal plane attendant on the scaling and a focusing function by being moved in the direction of its optical axis by a focusing drive unit 111. The image capturing apparatus 1 includes an imaging optical system in which a subject image is formed at an image capturing device 106 by the first fixed lens 101, the zoom lens 102, an aperture 103, the second fixed lens 104, and the focusing lens 105.

The image capturing device 106 comprises a CCD sensor or a CMOS image sensor, which photoelectrically converts the subject image formed by the imaging optical system to an image signal and then outputs the signal. A CDS/AGC unit 107 samples the output of the image capturing device 106 and controls its gain. CDS is an abbreviation for "correlated double sampling" and AGC is an abbreviation for "automatic gain control."

A camera signal processing unit 108 converts the output signal from the CDS/AGC unit 107 to a video signal by conducting various image processes. A monitor 109 is a liquid crystal display (LCD) or the like, which displays the video signal output from the camera signal processing unit 108. A recording unit 115 records the video signal from the camera signal processing unit 108 onto a recording medium (not shown), such as a magnetic tape, an optical disk, or a semiconductor memory, under the control of a control unit 114.

The zoom driving unit 110 moves the zoom lens 102 under the control of the control unit 114, and the focusing driving unit 111 moves the focusing lens 105 under the control of the control unit 114. The zoom driving unit 110 and the focusing driving unit 111 each include an actuator such as a stepping motor, a DC motor, a vibrating motor, or a voice coil motor.

Under the control of the control unit 114, an AF gate 112 passes only signals within an area for use in focus detection of the output signal representing every pixel generated at the image capturing device 106 output from the CDS/AGS unit 107. An AF signal processing unit 113 extracts a high-frequency component, a luminance component (i.e., a signal component representing the difference between the luminance-level maximum and minimum values of the signal having passed through the AF gate 112), and so on from the signal having passed through the AF gate 112, whereby an AF evaluation value signal is generated.

The AF evaluation value signal generated by the AF signal processing unit 113 is output to the control unit 114. The AF evaluation value signal is a signal that represents the sharpness (contrast status) of video produced based on the output signal from the image capturing device 106; however, the AF evaluation value signal consequently becomes a signal that represents the focusing status of the imaging optical system because the sharpness changes according to the focusing status of the imaging optical system.

The control unit 114 is a so-called microcontroller (or a microcomputer), which controls the operation of the entire image capturing apparatus 1. For example, the control unit 114 performs focusing control, that is, moves the focusing lens 105 by controlling the focusing driving unit 111. As the focusing control, the control unit 114 performs TV-AF-based focusing control (hereinafter simply referred to as TV-AF). Further, the control unit 114 can record the video signal from the camera signal processing unit 108 onto the recording medium in any format by controlling the recording unit 115.

A face detection unit 116 detects the face area of a human figure in the image captured by the image capturing device 106 by conducting a known face detection process on the video signal from the camera signal processing unit 108. Incidentally, examples of such a known face detection process include a method wherein face detection is performed based on the degree of the match between a flesh-colored area extracted from the gradient colors of respective pixels represented as image data and prepared facial contour templates. Also, disclosed are a method wherein face detection is performed by extracting feature points of a face, such as eyes, a nose, a mouth, and so on, through the use of a known pattern recognition technique and other face-detecting methods. In the present invention, a technique for the face detection process is not limited to the above techniques; any other suitable technique can be used.

The face detection unit 116 conveys the result of the face detection process to the control unit 114. Based on the detection result conveyed by the face detection unit 116, the control unit 114 controls the AF gate 112 so as to add an area for use in focus detection to a position including the face area in the captured image. More specifically, the control unit 114 notifies the AF gate 112 of coordinates representing the area for use in focus detection. The AF gate 112 transmits to the AF signal processing unit 113 only a signal representing the coordinate information conveyed from the control unit 114.

Next, main face determination control by the control unit 114 will be described below with reference to FIG. 2. Main face determination control is performed according to a computer program stored in the memory (not shown) of the control unit 114. Further, the operations of main face determination control are conducted successively in time-series on images consecutively captured at a predetermined frame rate by the image capturing device 106. Incidentally, depending on the performance of the face detection unit 116, the operations of main face determination control may be conducted at intervals of about several frames.

At the control unit 114, the area for use in focus detection is defined based on the position of a main face determined through main face determination control, and then TV-AF processing is performed on the area. Since TV-AF processing performed on a predetermined area is a known technique, explanation of such processing will be omitted.

Figure 2:
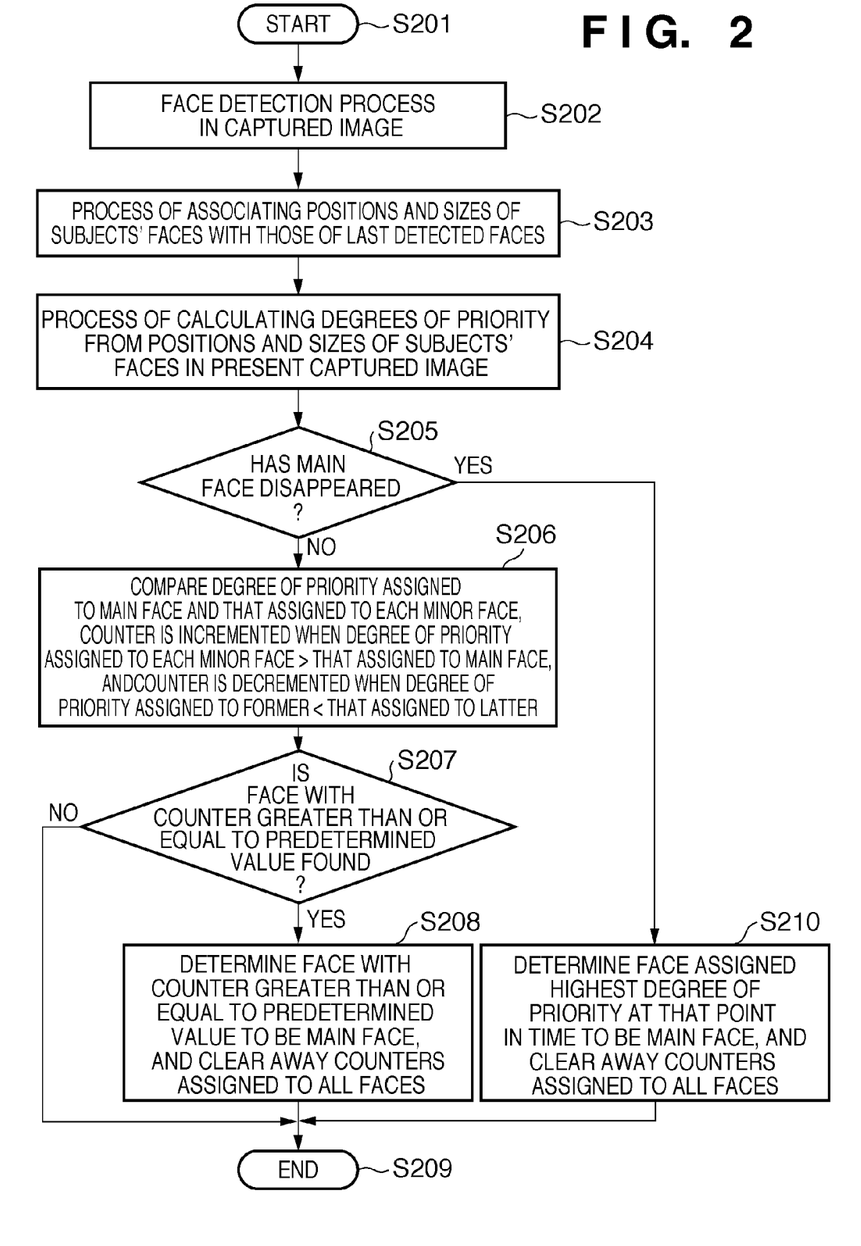
FIG. 2 is a flowchart showing a procedure for choosing a main subject according to the embodiment of FIG. 1.

As shown in FIG. 2, as the process is started at S201, the control unit 114 extracts the results of face detection in a present captured image from the face detection unit 116 at S202. The control unit 114 is provided with a buffer that temporarily stores data on the results of face detection extracted from the face detection unit 116. A storage region is secured at the buffer, where at least a present result and a preceding result of the results of face detection extracted from the face detection unit 116 are stored.

Next, the control unit 114 matches the faces detected in the present captured image with the faces detected in the preceding captured image stored in the buffer based on the positions and sizes of these faces, at S203. Based on the results of the matching, the control unit 114 associates the faces thought to be the face of one and the same human figure with each other from the preceding and present captured images, whereby the faces corresponding to the preceding detected faces are detected. As a result, from among the faces presently detected, the face identical with the main face in the preceding captured image can be detected.

The face images detected at the face detection unit 116 are assigned counter information to be mentioned below (hereinafter simply referred to as a "counter"). More specifically, the counters are stored in the aforementioned predetermined storage region secured in the buffer with the counters corresponding to the faces detected at S203. And then, in the case where a human figure in the present image and a human figure in the preceding image are determined to be the same person at S203, the counter stored corresponding to the face detected from the preceding image is used as it is.

The counters are ready to be assigned thereto (are secured in the buffer) in the same number as that of the positions of the detected faces that can be displayed in one frame. For example, when a user interface (UI) is used that is capable of representing the results for 30 faces detected at one time, 30 counters are also ready to be assigned thereto. Incidentally, when the face that has been heretofore detected as the face of the same human figure cannot be detected at S203, the counter brought into correspondence with the human figure is taken away. In contrast, when the face of another human figure not heretofore detected has been detected at S203, another counter (representing a value of 0) is brought into correspondence with the face of the human figure, whereby its count is started at 0.

Then the control unit 114 calculates the degrees of priority for main face determination to be assigned to faces detected in the present captured image at S204. In calculating the degrees of priority assigned to the faces, as described with reference to FIG. 6B, the degrees are set such that the closer to the center of the frame the faces are detected, the greater the weighting of the degree of priority is made, and the closer to the perimeter of the frame they are detected, the smaller the weighting is made. And further, as described with reference to FIG. 6A, in calculating the degrees of priority assigned to the faces, the degrees are set such that the larger the face sizes are, the greater the weighting is made, and the smaller their sizes are, the smaller the weighting is made. At S204, the control unit 114 multiplies (or adds) a value weighted according to the position of each face in the frame and a value weighted according to each face size, and makes the determination that the larger the products (or the sums) are, the higher the degrees of priority assigned to the faces are.

The above degrees of priority can be calculated by the control unit 114 based on at least one of the size of each detected face and the position of each face in the captured image. For example, when the degrees of priority are calculated based on only the sizes of the detected faces, the control unit 114 can set the value weighted according to the position of each face in the frame at 1, and multiply (or add) the value weighted according to each face size and the value of 1.

At S205, based on the matching results produced at S203, the control unit 114 determines whether or not the face that is regarded as the face of a human figure determined to have the main face at the time of the preceding face detection (last) is present in the faces detected in the present captured image. When the same face has been found from among the faces detected in the present captured image at the time of this determination, the control unit 114 goes to S206. On the other hand, when the face of the human figure determined to be the main face at the time of the preceding face detection has disappeared in the present captured image, the control unit 114 goes to S210.

At S206, the control unit 114 compares the degree of priority assigned to the face determined to be the main face at the time of the preceding face detection with that assigned to each of the other faces. Based on the comparison, in a case where some of the other faces have a higher degree of priority than the main face, the control unit 114 increments the counter values (which means counting the number of times the degree of priority assigned to one of the faces exceeds that assigned to the main face) associated with those faces; in a case where some of the other faces have a lower degree of priority than the main face, the counter values associated with those faces are decremented. That is, the control unit 114 counts, for each of the faces other than the main face, the number of times the degree of priority assigned to each of the faces other than the main face exceeds that assigned to the main face.

At S207, the control unit 114 determines whether or not a face with a counter value greater than or equal to a predetermined value (or exceeding a threshold value) has been found. When a face with a counter value greater than or equal to the predetermined value has been found, the control unit 114 goes to S208. At S208, the control unit 114 newly determines that the face with a counter value greater than or equal to the predetermined value is a main face, and then clears away the counter values associated with all the faces, whereby the main face determination process ends at S209. In contrast, when a face with a counter value greater than or equal to the predetermined value has not been found, the control unit 114 ends the main face determination process at S209. It is assumed that the predetermined value (or the threshold value) described above is preset in the memory or the like with reference to the intervals between the main face determination control processes and the like.

Here, the counter values are values representing frequencies with which the degrees of priority assigned to the faces are higher than the degree of priority assigned to the face determined to be the main face at that point in time, but not values representing how much higher or lower the degrees of priority assigned to the faces are. Here, the case presented in FIG. 7A, that is, the detection of face A having a sufficiently higher degree of priority than the preceding main face B is illustrated as follows:

Face A: 60% (Position)+100% (Size)=160%

Face B: 100% (Position)+40% (Size)=140%

In this case, only a count of 1 is added per each face detected. In a case where face A is the face of a human figure passing by and the face A image has abruptly become smaller than the face B image or has not been detected in a newly captured image, the count value associated with face A does not reach a predetermined value, and face A is therefore not determined to be a main face.

On the other hand, the case represented in FIG. 7B, that is, the detection of face A having a slightly higher degree of priority than preceding main face B is illustrated as follows:

Face A: 100% (Position)+40% (Size)=140%

Face B: 90% (Position)+40% (Size)=130%

In this case as well, only a count of 1 is added per each face detected. However, since face A is detected around the center of the frame at a high frequency, the count value associated with face A reaches a predetermined value, and face A is therefore determined to be the main face.

In other words, the counter value associated with each face represents a frequency with which each face appears to be a main face as compared with the already-detected main face. This means that when the counter value associated with one of the faces is large, that face is worthier of being considered a main face.

The purpose of clearing away the counter values associated with all the faces at the time of the main face changeover by the control unit 114 at S208 is to prevent the occurrence of a case where, through the incremental increase of the counter values associated with the faces other than the main face immediately after the changeover to the main face, changeover to another main face is immediately performed. Therefore the changeover to the main face is performed necessarily at regular intervals (the number of times the main face determination process comprising S201 to S209 is conducted exceeds at least a predetermined number of times). Although vary rare, in a case where counter values associated with a plurality of faces have simultaneously exceeded the predetermined value, the control unit 114 determines the face given the highest-degree priority in the present captured image to be a newly chosen main face.

At S210, the control unit 114 newly determines the face given the highest-degree priority of the faces detected in the present captured image to be a main face and then clears away (resets) the counter values associated with all the faces, whereby the main face determination process ends at S209.

Figure 3:
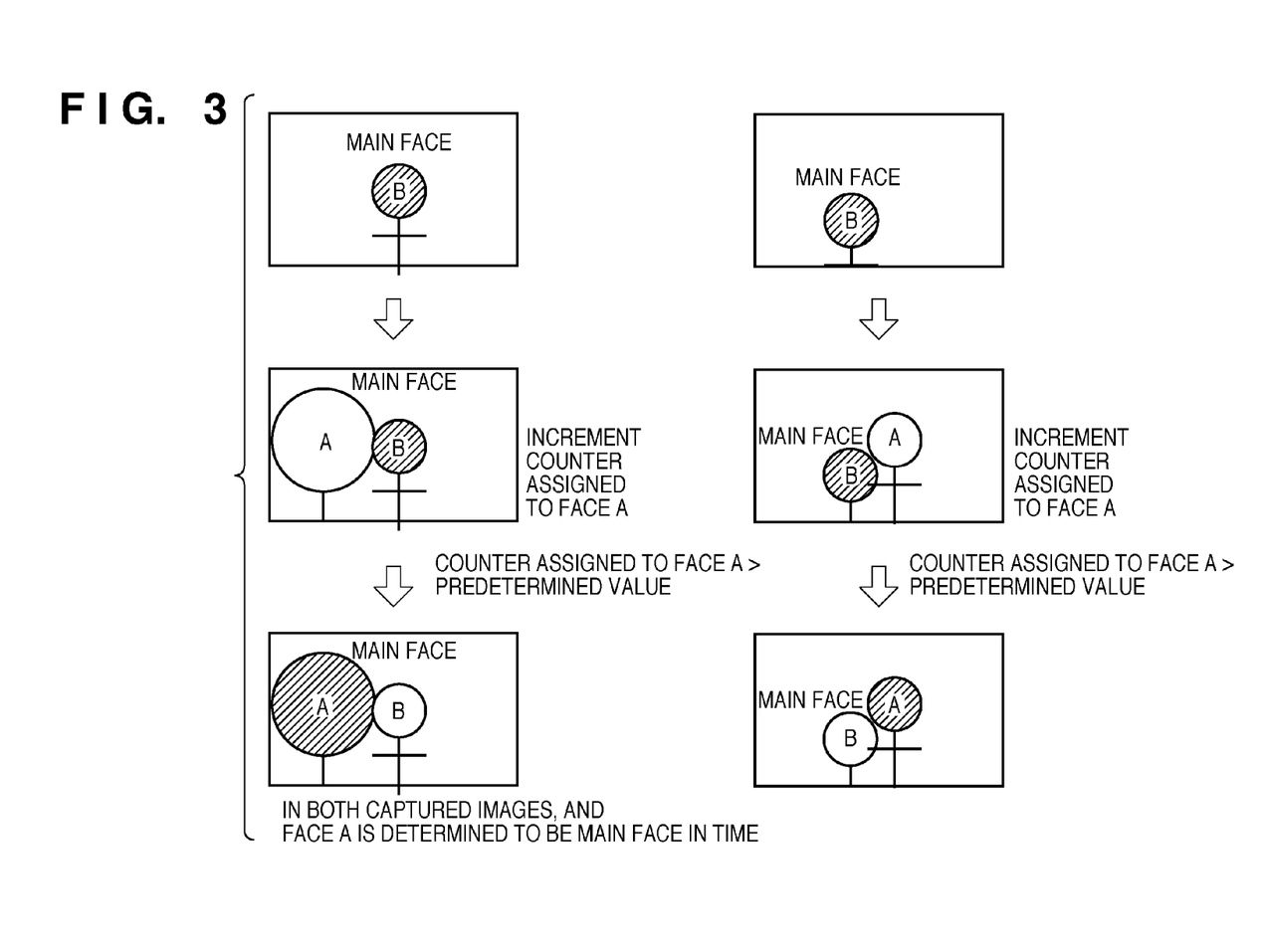
FIG. 3 illustrates example applications of the invention.

This paragraph describes an example application of the present invention with reference to FIG. 3. Like FIGS. 7A and 7B, the examples of FIG. 3 represent cases where a face A image appears after a face B image; the positions and sizes of both the faces are the same as those in the images of FIGS. 7A and 7B. As shown in FIG. 3, since the application of the present invention to those captured images brings about a state in which the degree of priority assigned to face A is higher than that assigned to main face B, the counter value associated with face A is incremented by repeating the main face determination process. Thereafter, when the counter value associated with face A has exceeded a predetermined value, face A is determined to be a newly chosen main face. Therefore, unlike the related art image capturing apparatus having experienced the problems illustrated in FIGS. 7A and 7B, in that the main face changeover is performed immediately and a slight difference between the degrees of priority has not effected the changeover from main face B, the image capturing apparatus according to the present invention can stably determine face A to be the main face as shown in FIG. 3.

As described above, in the image capturing apparatus according to the invention, by determining the same face to be a main face when the same face has a higher priority than the present main face the predetermined number of times, frequent main face changeover can be suppressed giving much consideration to the statuses of subjects in captured images. Further, since the degrees of priority are calculated based on the sizes and positions of faces detected in successively captured images, their calculation is not affected by the sizes and positions of previous faces. Therefore, when, in a plurality of successively captured images, a given face has a higher degree of priority than the present main face, and the user thinks that main face changeover should be performed, the image capturing apparatus according to the invention can precisely perform main face changeover.

In the image capturing apparatus 1, by controlling the focusing lens 105 so as to bring the face determined to be a main face into focus by means of TV-AF under the control of the control unit 114 after the foregoing main face determination process, the main face can be brought into focus. Similarly, in the image capturing apparatus 1, exposure control may be performed on the face determined to be the main face after the main face determination process by adjusting the aperture ratio of the aperture 103 by the use of an aperture driving unit (not shown) that operates under the control of the control unit 114.

The description presented in the above embodiment is only illustrative and is not intended to limit the scope of the invention. The configuration and operation of the image capturing apparatus according to the above embodiment can be changed as appropriate.

OTHER EMBODIMENTS

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-318942, filed Dec. 15, 2008, which is hereby incorporated by reference herein in its entirety.

What is claimed is:

1. A main face choosing device comprising:
    a face detection unit adapted to detect faces of human figures from video signal having a plurality of frames;
    an association unit adapted to associate faces of the same human figure among faces detected in the present frame and a preceding frame in which a face was most recently detected;
    a calculation unit adapted to calculate a degree of priority for each face detected in a frame based on at least one of size and position in the frame of each detected face;
    a main face choosing unit adapted to choose a main face from among the detected faces based on the degree of priority calculated for each detected face;
    a determination unit adapted to determine as the main face of the present frame, from among the faces detected in the present frame, a face which is associated with a face that was chosen as the main face by the main face choosing unit from among the most recently detected faces;
    a comparison unit adapted to compare the degree of priority calculated for the main face in the present frame and the degrees of priority calculated for faces other than the main face in the present frame; and
    a counting unit adapted to count, for a plurality of frames and for each of the faces other than the main face, a number of times of which the degrees of priority exceed the degree of priority calculated for the main face,
    wherein when, the number of times counted for one of the faces other than the main face exceeds a preset threshold value, the main face choosing unit is arranged to choose the one of the faces as a new main face.

2. The main face choosing device according to claim 1, wherein, when no face detected in the present frame is associated with the main face, the main face choosing unit is arranged to choose a face given a highest degree of priority from amongst the detected faces as the new main face.

3. The main face choosing device according to claim 1, wherein when the numbers of times counted by the counting unit for more than one of the faces other than main face exceed the threshold value, the main face choosing unit is arranged to choose a face given the highest degree of priority from amongst the more than one faces as the new main face.

4. The main face choosing device according to claim 1, wherein when the main face choosing unit has chosen the new main face, the counting unit is arranged to reset the number of times counted by the counting unit for each of the faces other than the main face.

5. The main face choosing device according to claim 1, wherein when the degrees of priority calculated for the faces other than the main face have fallen short of the degree of priority calculated for the main face at a time of comparison, the counting unit is arranged to decrement the number of times counted for the faces other than the main face.

6. An image capturing apparatus comprising:
an image capturing unit;
the main face choosing device according to claim 1; and
a control unit adapted to control the image capturing apparatus to focus on a main face chosen by the main face choosing device or to correct exposure for the chosen main face.

7. A method for controlling a main face choosing device, the method comprising the steps of:
detecting faces of human figures from video signal having a plurality of frames;
associating faces of the same human figure among faces detected in the present frame and a preceding frame in which a face was most recently detected;
calculating a degree of priority for each of the faces detected in a frame based on at least one of size or position in the frame of the detected faces;
choosing a main face from among the detected faces based on the degree of priority calculated for each detected face;
determining as the main face of the present frame, from among the faces detected in the present frame, a face which is associated with a face that was chosen as the main face at the choosing step from among the most recently detected faces;
comparing the degree of priority calculated for the main face in the present frame and the degrees of priority calculated for faces other than the main face in the present frame; and
counting, for a plurality of frames and for each of the faces other than the main face, a number of times of which the degrees of priority exceed the degree of priority calculated for the main face,
wherein, when the number of times counted by a counting unit for one of the faces other than the main face exceeds a preset threshold value, the one of the faces is chosen as a new main face at the choosing step.

* * * * *